United States Patent [19]

Gembicki et al.

[11] 4,124,537

[45] Nov. 7, 1978

[54] COEXTRUDED CATALYTIC COMPOSITE

[75] Inventors: Stanley A. Gembicki, Western Springs; Charles L. Morgan, Des Plaines, both of Ill.

[73] Assignee: UOP Inc., Des Plaines, Ill.

[21] Appl. No.: 832,122

[22] Filed: Sep. 12, 1977

[51] Int. Cl.$^2$ .......................... B01J 23/16; B01J 23/64
[52] U.S. Cl. .............................. 252/465; 252/455 R; 252/470
[58] Field of Search .................. 252/416, 448, 455 R, 252/465, 470; 208/216

[56] References Cited

U.S. PATENT DOCUMENTS

| | | | |
|---|---|---|---|
| 3,562,150 | 2/1971 | Hamilton et al. | 252/416 X |
| 3,935,127 | 1/1976 | Conway | 252/465 |

Primary Examiner—Carl Dees
Attorney, Agent, or Firm—James R. Hoatson, Jr.; William H. Page, II; Robert W. Welch

[57] ABSTRACT

A catalytic composite comprising a refractory inorganic oxide-supported Group VIB and Group VIII metal component is disclosed. The catalytic composite is characterized by a method of preparation which comprises coextruding a precursor compound of the Group VIB metal component, a precursor compound of the Group VIII metal component, and a finely divided refractory inorganic oxide admixed with hydrogen peroxide and sufficient water to provide an extrudable dough. The coextruded product is subsequently dried and calcined to yield an improved catalytic composite, particularly with respect to the hydrodesulfurization of residual fuel oils.

12 Claims, No Drawings

COEXTRUDED CATALYTIC COMPOSITE

It has become well known that oxides of sulfur, plus lesser amounts of other sulfurous compounds are among the major pollutants of the atmosphere. It has been estimated that, in this country alone, an excess of 23 million tons of sulfur dioxide has been discharged into the atmosphere on an annual basis. The increasingly deleterious effect of the sulfurous pollutants with respect to cardiorespiratory disease, eye irritation, and the like, has prompted rather severe legislative action to control the amount of sulfur dioxide discharged into the atmosphere, particularly in densely populated areas where the problem is more acute. It has been recognized that the combustion of petroleum products accounts for a substantial portion of said oxides of sulfur, and legislation has been effected or proposed which is particularly directed to the limitation of sulfurous compounds in residual fuel oils to be burned in densely populated areas. The supply of residual fuel oils of low sulfur content is entirely inadequate for present day requirements and it becomes increasingly important to develop improved desulfurization techniques to treat the more accessible and abundant fuel oils of relatively high sulfur content.

Desulfurization technology is presently concerned with hydrotreating of hydrodesulfurization methods, and to the development of catalysts that are more selective and/or function under less severe reaction conditions to obviate any excessive hydrocracking of the residual fuel oils being treated. Hydrodesulfurization catalysts typically comprise a Group VIB metal component, a Group VIII metal component and a refractory inorganic oxide support or carrier material. While coextrusion of the Group VIB and Group VIII metal components with the refractory inorganic oxide support or carrier material would appear to be the simplest and most economical method of manufacture, catalysts manufactured in this manner are in most cases less active than those prepared by the more tedious method of impregnating said metal components on a pre-extruded support or carrier material.

It is therefore an object of this invention to present an improved coextruded catalytic composite, particularly with respect to the dehydrosulfurization of residual fuel oils, said coextruded catalytic composite being characterized by a novel method of preparation.

Thus, in one of its broad aspects, the present invention embodies a catalytic composite comprising a refractory inorganic oxide supported Group VIB and Group VIII metal component prepared by the method which comprises coextruding a precursor compound of said Group VIB metal component, a precursor compound of said Group VIII metal component, and a finely divided refractory inorganic oxide or inorganic oxide precursor thereof, admixed with hydrogen peroxide and sufficient water to provide an extrudable dough, and drying and calcining the coextruded product.

One of the more specific embodiments relates to a catalytic composite comprising an alumina-supported molybdenum and cobalt component prepared by the method which comprises coextruding ammonium molybdate, cobalt nitrate, and a finely divided alpha-alumina monohydrate admixed with hydrogen peroxide and sufficient water to form an extrudable dough characterized by a weight loss on ignition at 900° C. of from about 50 to about 70 wt. %, and drying and calcining the coextruded product.

Another and more specific embodiment of the present invention concerns a catalytic composite prepared by the method which comprises coextruding ammonium molybdate, cobalt nitrate and a finely divided alpha-alumina monohydrate admixed with from about 2 to about 10 wt. % hydrogen peroxide and sufficient water to provide an extrudable dough characterized by a weight loss on ignition at 900° C. of from about 50 to about 70%, said ammonium molybdate and cobalt nitrate being in sufficient concentration to provide a catalytic composite comprising from about 4 to about 30 wt. % molybdenum and from about 1 to about 10 wt. % cobalt, and drying and calcining the coextruded product in air at a temperature of from about 315° to about 345° C. for a period of from about 1 to about 4 hours, in air containing from about 15 to about 30 wt. % steam and thereafter at a temperature of from about 475° to about 550° C. for a period of from about 1 to about 3 hours.

Other objects and embodiments of this invention will become apparent in the following detailed specification.

The catalytic composite herein contemplated is characterized by a method of preparation comprising the coextrusion of a precursor compound of a Group VIB metal component, for example ammonium molybdate, a precursor compound of a Group VIII metal component, for example cobalt nitrate, a finely divided refractory inorganic oxide, for example alpha-alumina monohydrate, and hydrogen peroxide. The expression "finely divided" is intended as descriptive of particles having an average diameter of less than about 150 microns, for example, particles recovered through a 105 micron microsieve. The refractory inorganic oxide can be such as alumina, silica, zirconia, thoria, boria, chromia, magnesia, titania, and the like, or composite thereof, for example, alumina-silica, alumina-zirconia, alumina-chromia, etc. Alumina is a preferred refractory inorganic oxide, particularly alpha-alumina monohydrate of the boehmite structure. Finely divided alpha-alumina monohydrate is commercially available in various densities. However, an alpha-alumina monohydrate of one density is not necessarily equivalent to an alpha-alumina monohydrate of another density with respect to the hydrotreating process herein contemplated. An alpha-alumina monohydrate especially suitable for use herein is one having an average bulk density of from about 0.4 to about 0.5 gms/cc. It is a preferred practice to employ an alpha-alumina monohydrate blend, specifically, a blend of an alpha-alumina monohydrate having an average bulk density of from about 0.7 to about 0.9 gms/cc with an alpha-alumina monohydrate having an average bulk density of from about 0.2 to about 0.3 gms/cc, taking advantage of the catalytic properties of the higher density alumina and the bonding properties of the lower density alumina to provide an extruded product of suitable durability as well as improved activity. In any case, the alpha-alumina monohydrates are preferably combined in a ratio to provide a blend with the aforementioned average bulk density of from about 0.4 to about 0.5 gms/cc.

As heretofore mentioned, the finely divided refractory inorganic oxide is coextruded with a precursor compound of a Group VIB metal component and a precursor compound of a Group VIII metal component. The Group VIB metal component is preferably molybdenum, and a preferred precursor compound thereof is ammonium molybdate. A preferred Group VIII Metal component is cobalt, with cobalt nitrate being a preferred precursor compound thereof. Other suitable Group VIB metal compound, that is, compounds of molybdnum, tungsten, and chromium, include molybdic acid, ammonium chromate, chromium acetate, chromous chloride, chromium nitrate, tungstic acid, etc. Other Group VIII metal compounds which may be employed, that is compounds of iron, nickel, cobalt, platinum, palladium, rhodium, ruthenium, osmium and iridium, include nickel nitrate, nickel sulfate, nickel chloride, nickel acetate, cobaltous nitrate, cobaltous sulfate, ferric nitrate, ferric sulfate, platinum chloride, palladium chloride, and the like. In any case, the selected Group VIB metal compound and Group VIII metal compound are employed in an amount to provide a final catalytic composite comprising from about 4 to about 30 wt. % Group VIB metal, and from about 1 to about 10 wt. % Group VIII metal.

Pursuant to the present invention, the selected precursor compounds of a Group VIB and a Group VIII metal component are admixed and coextruded with a finely divided refractory inorganic oxide in the presence of hydrogen peroxide. The hydrogen peroxide is employed as an aqueous solution thereof, a 2% to about a 6% concentration being preferable. In any case, the aqueous hydrogen peroxide solution is utilized in an amount to provide from about 5 to about 25 wt. % hydrogen peroxide based on the combined weights of the refractory inorganic oxide and the Group VIB and the Group VIII metal compounds, and sufficient water is included to provide an extrudable dough characterized by a weight loss on ignition at 900° C. of from about 50 to about 70%.

The Group VIB metal compound, Group VIII metal compound and finely divided refractory inorganic oxide are advantageously admixed with the hydrogen peroxide and water utilizing conventional shear-mixing techniques to achieve a uniform dispersion of the components of the resulting paste or dough. Generally, shear-mixing means will be employed which comprise a multitude of blades or paddles rotating in adjacent planes about a common shaft, with a shearing or grinding effect resulting from a minimal clearance between the rotating blades, blades and sidewalls, and/or blades and one or more stationary shear bars. Shear-mixers are typically designed to maintain the total mixture in close proximity to the rotating blades or paddles to take full advantage of the shearing effect. The power input per unit mass is a convenient measure of the intensity of severity of the mixing operation with respect to a particular mixture. For example, an energy input equivalent to about 10 watt-hours per pound of dry refractory inorganic oxide present in the mixture of this invention over a period of from about 0.5 to about 5 minutes (corresponding to a power input of from about 120 to about 1200 watts per pound) has been found to effect a shear-mixing operation of suitable intensity or severity to result in a uniform dispersion of the component of said mixture.

The extrusion operation is suitably effected with commercial extrusion apparatus. For example, the dough is continuously processed through a cylinder by means of a rotating screw, and pressured through a perforated plate at one end of the cylinder. The extrudate may be cut into particles of desired length prior to drying and calcining by means of a rotating knife as the extrudate emerges from the perforated plate. Alternatively, the extrudate may be broken into particles of random length during the drying and calcining process.

In any case, the extrudate is dried and calcined, drying being usually accomplished at a temperature up to about 120° C. over a 1-24 hour period. Calcination is suitably effected in an oxidizing atmosphere at a temperature of from about 315° to about 615° C. A preferred method comprises heating the extrudate in air containing 15-25% steam at a temperature of from about 315° to about 350° C. over a period of from about 0.5 to about 2 hours, and thereafter in air at a temperature of from about 350° to about 650° C. for a period of from about 1 to about 2 hours.

The hydrotreating or hydrodesulfurization process herein contemplated is effected in contact with the catalytic composite of this invention at reaction conditions obviating any substantial hydrocracking of the residual fuel oils being treated. Said reaction conditions typically include a temperature of from about 95° to about 425° C., although temperatures in the higher range, said from about 315° to about 425° C. are generally preferred. Hydrodesulfurization reaction conditions further include an imposed hydrogen pressure of from about 100 to about 2000 psi, the hydrogen being normally charged to the process in admixture with recycled hydrogen to provide from about 1000 to about 50,000 standard cubic feet per barrel of hydrocarbon charge stock. The sulfur-containing feed stock is suitably processed over the catalyst in combination with the hydrogen charge at a liquid hourly space velocity of from about 0.5 to about 20.

The following examples are presented in illustration of one preferred embodiment of this invention, and are not be be construed as an undue limitation on the generally broad scope of the invention as set out in the appended claims.

EXAMPLE I

In this example, representing one preferred embodiment of this invention, a coextruded catalytic composite comprising alumina-supported cobalt and molybdnum components was prepared by dissolving cobalt nitrate and ammonium molybdate in a 3 wt. % aqueous hydrogen peroxide solution, the resulting solution being added to an alpha-alumina monohydrate blend and subjected to intensive mixing. About 5 wt. % methylcellulose was included in the mixture as a binding agent. The alpha-alumina monohydrate employed, about 95% of which was filterable through a 105 micron microsieve, had an average bulk density of about 0.5 grams per cubic centimeter. The alumina was a blend of Catapal S alumina (0.79 grams per cubic centimeter ABD) and Kaiser Medium alumina (0.23 gms/cc ABD). The resulting dough, characterized by a 55–60% weight loss on ignition at 900° C., was extruded through a die plate comprising 0.0595 inches perforations, and the extrudate was dried and calcined. Calcination was effected by heating the extrudate in air containing 22% steam for 1 hour at 330° C., and thereafter in air at 510° C. for 2 hours. The catalytic composite thus prepared contained 3.2 wt. % cobalt and 13.4 wt. % molybdenum.

EXAMPLE II

The coextruded catalytic composite of this example was prepared substantially as described with respect to the catalytic composite of the previous example, except that the nitric acid, substituted for the hydrogen peroxide, precluded the use of methylcellulose as a binding agent. Thus, cobalt carbonate and ammonium molybdate were dry-mixed with an alpha-alumina monohydrate blend, and then subjected to intensive mixing in admixture with a 5% aqueous nitric acid solution to form a dough characterized by a 55–60% weight loss on ignition at 900° C. As in the previous example, the alumina was a blend having an average bulk density of about 0.4 gms/cc, with 95% being filterable through a 105 micron microsieve. The resulting dough was extruded, dried and calcined in the described manner to yield a catalytic composite comprising 3.2 wt. % cobalt and 13.4 wt. % molybdenum.

The above-described catalytic composites were evaluated with respect to the desulfurization of a vacuum gas oil boiling in the 315°–565°C. range and containing 2.6 wt. % sulfur. In each case, the catalyst was disposed as a fixed bed in a vertical tubular reactor maintained at 750 psig and 385° C. The vacuum gas oil was charged over the catalyst at 3.2 liquid hourly space velocity in admixture with 1800 standard cubic feet of hydrogen per barrel of feed stock. The reactor effluent was separated into a liquid and gaseous phase in a high pressure separator at 93° C. and the liquid phase was treated in a stripper column for the separation of light ends. Four two-hour test periods were run, each separated by a 10 hour line-out period. The liquid stripper bottoms from each test period were analyzed for sulfur and the arithmetic average of the four test periods was used to determine the activity of the catalyst relative to that of a reference standard catalyst under the same conditions, the standard catalyst comprising 2.5 wt. % cobalt and 8.7 wt. % molybdenum on 1/16 inch of alumina spheres. The relative activity was computed as the ratio of the desulfurization rate of the test catalyst to that of the reference catalyst. The catalytic composite of Example I, prepared in accordance with the method of the present invention, registered a relative activity number of 142 as opposed to a relative activity number of 101 for the catalytic composite of Example II.

We claim as our invention:

1. A catalytic composite comprising a refractory inorganic oxide-supported Group VIII and Group VIB metal component prepared by the method which comprises coextruding a precursor compound of said Group VIII metal component, a precursor compound of said Group VIB metal component and a finely divided refractory inorganic oxide or inorganic oxide precursor thereof, admixed with hydrogen peroxide and sufficient water to provide an extrudable dough, and drying and calcining the coextruded product.

2. The catalytic composite of claim 1 further characterized in that said finely divided inorganic oxide is a finely divided alumina.

3. The catalytic composite of claim 1 further characterized in that said finely divided inorganic oxide is a finely divided alpha-alumina monohydrate.

4. The catalytic composite of claim 1 further characterized in that said finely divided inorganic oxide is a finely divided alpha-alumina monohydrate with an average bulk density of from about 0.4 to about 0.5 gms/cc.

5. The catalytic composite of claim 1 further characterized in that said precursor compound of a Group VIII metal component and said precursor compound of a Group VIB metal component are utilized in an amount to provide a catalytic composite comprising from about 1 to about 10 wt. % Group VIII metal and from about 4 to about 30 wt. % Group VIB metal.

6. The catalytic composite of claim 1 further characterized in that said precursor compound of a Group VIII metal component, precursor compound of a Group VIB metal component and finely divided refractory inorganic oxide or inorganic oxide precursor thereof, are admixed with from about 5 to about 25 wt. % hydrogen peroxide.

7. The catalytic composite of claim 1 further characterized in that said precursor compound of a Group VIII metal component, precursor compound of a Group VIB metal component and finely divided refractory inorganic oxide or inorganic oxide precursor thereof, are admixed with from about 5 to about 25 wt. % hydrogen peroxide and sufficient water to provide an extrudable dough characterized by a weight loss on ignition at 900° C. of from about 50 to about 70%.

8. The catalytic composite of claim 1 further characterized in that said Group VIII metal component is cobalt.

9. The catalytic composite of claim 1 further characterized in that said Group VIB metal component is molybdenum.

10. The catalytic composite of claim 1 further characterized in that said precursor compound of a Group VIII metal is cobalt nitrate.

11. The catalytic composite of claim 1 further characterized in that said precursor compound of a Group VIB metal is ammonium molybdate.

12. The catalytic composite of claim 1 further characterized in that said coextruded product is calcined in air containing from about 15 to 30% steam at a temperature of from about 315° to about 345° C. for a period of from about 0.5 to about 1.5 hours, and thereafter at a temperature of from about 475° to about 550° C. for a period of from about 1 to about 3 hours in air.

* * * * *